United States Patent [19]

Nye et al.

[11] Patent Number: 4,981,894

[45] Date of Patent: Jan. 1, 1991

[54] HALOGEN-FREE MELT PROCESSABLE SILICON-IMIDE WIRE COATING COMPOSITIONS HAVING LOW SMOKE VALUES

[75] Inventors: Susan A. Nye, Feura Bush; Sandra A. Swint, Schenectady, both of N.Y.

[73] Assignee: General Electric Company, Schenectady, N.Y.

[21] Appl. No.: 385,511

[22] Filed: Jul. 27, 1989

[51] Int. Cl.$^5$ .................................................. C08K 5/10
[52] U.S. Cl. .................................... 524/401; 524/293; 524/297; 524/588; 428/458; 428/391
[58] Field of Search ............... 524/405, 293, 588, 294, 524/295, 296, 297, 298; 428/458, 391

[56] References Cited

U.S. PATENT DOCUMENTS

| | | | |
|---|---|---|---|
| 3,912,650 | 10/1975 | Khalid et al. | 524/405 |
| 4,687,611 | 8/1987 | Sroog | 524/297 |
| 4,833,190 | 5/1989 | Cella et al. | 524/405 |

FOREIGN PATENT DOCUMENTS 2193216  2/1988  United Kingdom .

OTHER PUBLICATIONS

G. A. Skinner, *J. Chem. Tech. Biotechnol,* 1981, 31, "Smoke-The Hazard, The Measurement and the Remedy", pp. 445–452.
PCT WO82/02400, published Jul. 22, 1982.

*Primary Examiner*—Veronica P. Hoke
*Attorney, Agent, or Firm*—William A. Teoli; James C. Davis, Jr.; William H. Pittman

[57] ABSTRACT

Melt processable halogen-free low smoke wire coating compositions are provided which utilize a polyimide-siloxane, an effective amount of a plasticizer and hydrated zinc borate. The melt processable halogen-free low smoke blends can satisfy the low smoke requirements for plenum wire as shown by an Ohio State University test value of total smoke after 5 minutes of less than 100.

8 Claims, No Drawings

HALOGEN-FREE MELT PROCESSABLE SILICON-IMIDE WIRE COATING COMPOSITIONS HAVING LOW SMOKE VALUES

BACKGROUND OF THE INVENTION

The present invention relates to plasticized poly(imide-siloxane)s which have low smoke values. More particularly, the present invention relates to the employment of hydrated zinc borate and an organic plasticizer with poly(imide-siloxane)s to provide adherent wire coating compositions which satisfy the low smoke requirements of plenum wire.

Prior to the present invention, considerable effort was expended by the wire coating industry for screening various materials for the manufacture of plenum wire. As known by those skilled in the art, plenum wire is cable approved by Underwriters Laboratories for installation in central air handling systems. A principal consideration is that the insulating material must show a reduced smoke release rate when burned.

Teflon resin is widely recognized by the wire coating industry as an outstanding material with respect to reduced smoke generation. However, as reported by Y. C. Alarie et al., *Fire Materials*, 1984, 8, 52 and Y. C. Alarie et al., *Fire Science Technology*, 1982, 1, Teflon resin can generate extremely toxic vapors when exposed to flame Ultem ® resin manufactured by GE also has gained attention for its low smoke properties. Even though it has many desirable characteristics, Ultem resin is not used extensively as a plenum wire coating insulator as it does not satisfy the processing characteristics or mechanical properties for directly coating the wire by standard techniques. An improvement in polyetherimide processing is shown by Cella et al., U.S. Pat. No. 4,690,997, incorporated herein by reference, which incorporates through amine-anhydride condensation, a diorganosiloxane block into the resulting polyetherimide. Although Cella et al. has demonstrated that particular silicon-polyimides can be satisfactorily extruded onto wire to produce a flame retardant wire coating, these materials have not satisfied the stringent low smoke requirements of the plenum wire coating industry. Cella et al., U.S. Pat. No. 4,833,190 further enhanced the low smoke properties of the silicon-polyimides of U.S. Pat. No. 4,690,997 by use of certain metal borates, such as zinc borate. Even though substantial smoke reduction has been achieved using these blends of silicon-polyimide and hydrated zinc borate, these blends, nevertheless, showed a Total Smoke/M$^2$ value or "TS" value exceeding 500 after a 5 minute burn, in accordance with the Ohio State University Test, or "OSU" Test. In order to satisfy the stringent requirements of the plenum wire industry, it is desirable to have a TS value of 100 or less. The Ohio State University Smoke and Heat Test (ASTM-E96) is defined as follows:

Polymer plaques (6"×6"×1/16") are mounted in the horizontal mode of the test chamber. The environmental test chamber contains a constant flow of air throughout the test. Combustion is initiated by a non-piloted ignition, piloted ignition of evolved gases, or by point ignition of the surface. If ignited by piloted ignition, the end of the burner tubing is 10 mm above and perpendicular to the exposed horizontal surface of the specimen. The changes in optical density of the gas leaving the chamber are monitored and from this data, smoke release rates are determined. The results for total smoke evolved and smoke release rates are reported in smoke/squared meter of sample and smoke/min/squared meter respectively. The "SMOKE" unit is defined by the concentration of smoke particulates in a cubic meter of air that reduces the percent transmission of light through a 1 meter path to 10% as measured by a calibrated photometer.

Calculations: SMOKE Release Rate = $D/kLA(V_o/t)$
where:
K absorption coefficient = 1.0 squared meter/smoke
D optical density (absorbance) = log (100%T)
L light path = 0.134 m (stack width)
A exposed surface area of specimen, squared meter
$V_o/t$ flow rate of air leaving apparatus, cubic meter/min = $V_i/t \times T_o/T_i$
$V_i/t$ flow rate of air entering apparatus, cubic meter/min
$T_i, T_o$ absolute temperature of air in and out of apparatus respectively.

SUMMARY OF THE INVENTION

The present invention is based on the discovery that certain poly(imide-siloxane)s shown by Rich et al, U.S. Pat. No. 4,795,680, incorporated herein by reference, having recurring chemically combined imide-siloxane groups of the formula,

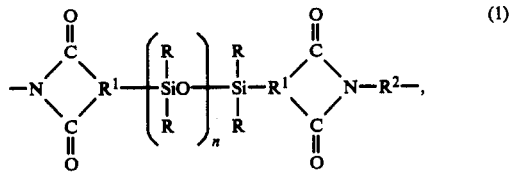

exhibit a TS value, after a 5 minute burn, of less than 350, where R is a $C_{(1-14)}$ monovalent hydrocarbon radical, or a $C_{(1-14)}$ monovalent hydrocarbon radical substituted with the same or different radicals inert during condensation reactions, $R^1$ is a $C_{(6-14)}$ trivalent aromatic organic radical, $R^2$ is a $C_{(6-14)}$ divalent aromatic organic radical and n is an integer equal to 1 to about 25 inclusive.

It has been found that a significant improvement in reduced smoke generation can be achieved when an effective amount of hydrated zinc borate is incorporated into the poly(imide-siloxane) of formula 1. However, attempts to extrude the resulting blend onto wire have been unsuccessful as the poly(imide-siloxane)-hydrated zinc borate blend does not adhere when extruded onto the wire. However, the incorporation of an organic plasticizer, such as tetrabenzoylpentaerythritol, in an amount sufficient to provide a melt viscosity of 15,000 to 25,000 poise at 100 radians per second at about 250° C. to 280° C., resulted in the production of an adherent melt extrudable poly(imide-siloxane) blend. This plasticizer addition, surprisingly did not adversely affect the OSU test results. In fact a TS value of less than 100 after a 5 minute burn, and even as low as 38 was achieved.

STATEMENT OF THE INVENTION

There is provided by the present invention, an adherent, melt processable, halogen-free wire coating composition comprising polyimide-siloxane having recurring condensed groups of formula (1) and an amount of crystallized zinc borate which is effective to provide a total smoke/squared meter value after a 5 minute burn of less than about 100, in accordance with the Ohio State University smoke test.

The polyimide-siloxanes having recurring condensed groups of formula (1), can be made by condensing aromatic anhydride-terminated organopolysiloxanes or siloxane anhydride of the formula

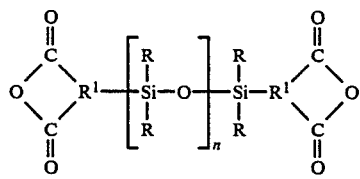
(2)

or a mixture of such aromatic anhydride-terminated organopolysiloxane and an organic dianhydride, such as aromatic bis(ether anhydride) of Heath et al., U.S. Pat. No. 3,847,867 with organic diamine having the formula $NH_2R^2NH_2$,  (3)

where R, $R^1$ and $R^2$ and n are as previously defined. Additional aromatic organic dianhydride or mixtures thereof which can be used in combination with the aromatic anhydride-terminated organopolysiloxane of formula (2) are, for example, pyromellitic dianhydride, benzophenone dianhydride, 3,3',4,4'-biphenyl tetracarboxylic anhydride, sulfonyl-bis(4-phthalic anhydride), 3,3',4,4'-diphenylsulfidetetracarboxylic anhydride, bisphenol dianhydride, oxy-bis(4-phthalicanhydride, or silyl norbornane anhydride as shown by Ryang, U.S. Pat. No. 4,381,396.

Aromatic organic diamines which are included within formula (3) are included within the teaching of Rich et al U.S. patent 4,795,680 col. 7, lines 14-54, which is incorporated herein by reference.

The polyimide-siloxanes used in the practice of the present invention can be synthesized by effecting reaction at temperatures in the range of from 150° C. to 300° C., substantially equal molar amounts of the siloxane anhydride of formula (2), or a mixture of siloxane anhydride and organic dianhydride, with the organic diamine in the presence of an inert organic solvent. Sufficient aromatic anhydride terminated organopolysiloxanes of formula (2) should be used to provide from 30% to 70% by weight of silicone based on the total weight of poly(imide-siloxane).

Inert organic solvents which can be utilized are, for example, ortho dichlorobenzene, xylene, and dipolar aprotic solvent, for example, dimethylformamide, dimethylacetamide, N-methylpyrrolidone. The siloxane dianhydride of formula (2), where n is greater than 1, can be made by equilibrating the siloxane dianhydride where n is 1, with cyclopolysiloxanes, such as hexaorganocyclotrisiloxane, or octaorganocyclotetrasiloxane in the presence of a conventional equilibration catalyst.

Radicals included within R of formulas (1) and (2) are, for example, $C_{(1-8)}$ alkyl radicals, for example, methyl, ethyl, propyl, butyl, octyl, etc.; alkenyl radicals, for example, vinyl, allyl, cyclohexenyl, etc.; aryl radicals, alkaryl radicals, alkoxyaryl radicals, for example, phenyl, methoxyphenyl tolyl, xylyl, biphenyl, naphthyl, etc.

Radicals included with $R^1$ are, for example,

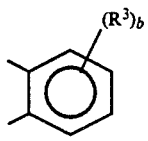

where $R^3$ are monovalent neutral radicals, such as R, and $C_{(1-8)}$ alkoxy, and b is an integer having a value of from 1 to 3 inclusive.

Radicals included within $R^2$ are, for example, divalent $C_{(6-20)}$ aromatic organic radicals such as aromatic hydrocarbon radicals, and divalent radicals included by the formula

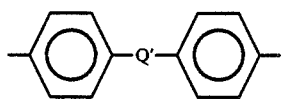

where Q' is a member selected from the class consisting of

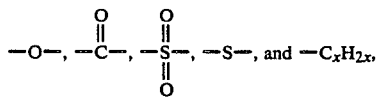

and x is a whole number from 1 to 5 inclusive.

Plasticizers which can be used in the practice of the present invention to reduce the melt viscosity and enhance the melt flow are, for example, tetrabenzoyl pentaerythritol, dialkylphthalates, alkylbenzoates, alkylene glycols dibenzoates, glyceryl tribenzoate.

Crystallized zinc borate which can be used in the practice of the present invention is preferably Firebrake ZB ®, a product of The U.S. Borax Company having the formula ($2Zn0.3B_2O_3.3.5H_2O$).

In the practice of the invention, polyimide siloxane is blended with the hydrated zinc borate and plasticizer utilizing a roll mill or a melt extruder. The order of addition of the various ingredients is not critical. It has been found that effective results can be achieved if the intrinsic viscosity of the polyimidesiloxane is measured in $CHCl_3$ at 25° C. and is maintained in the range of between about 0.40 to 0.50 and preferably 0.45. An effective amount of zinc borate which can be used is 2 to 10 parts of zinc borate, and preferably 3.5 to 7 parts, per 100 parts of polyimide siloxane. The amount of plasticizer which can be used has been previously defined with respect to melt viscosity. However, an amount which is effective for maintaining a melt flow at a temperature in the range of from about 240° C. to 290° C. utilizing a 16.6 kilogram weight of from about 1.5 to 3.0 g/min also can be used to calculate plasticizer requirements. Again, plasticizer requirements can be satisfied by using about 1-8% by weight and preferably 3-5% by weight based on the weight of plasticizer polyimidesiloxane.

In order that those skilled in the art will be better able to practice the present invention, the following examples are given by way of illustration and not by way of limitation. All parts are by weight unless otherwise indicated.

EXAMPLE 1

A polyimide siloxane was prepared by initially heating, with stirring, at a temperature of 80°-90° C., a mixture of 1.80 kilograms (16.67 moles) of paraphenylenediamine, 3.35 kilograms (30.95 moles) of metaphenylenediamine and 60 liters of orthodichlorobenzene. After a 15 minute period, there was then added to the mixture, 23.76 kilograms (16.08 moles) of a phthalic anhydride-terminated polydimethylsiloxane having an average of 15.2 dimethylsiloxy units with an additional 60 liters of orthodichlorobenzene. The mixture was heated to 110° C., with stirring, for an additional 15 minutes and there was added 15.7 kilograms (29.87 moles) of 2,2-bis[4-(3,4-dicarboxyphenoxy)phenyl]propane dianhydride, 450 grams (3.04 mole) of phthalic anhydride, 224 grams (1.9 moles) of dimethylaminopyridine and 60 liters of orthodichlorobenzene. The stirring rate of the mixture was increased and heating was continued until the internal temperature of the mixture was 125°-130° C. Water and orthodichlorobenzene began to distill as the temperature was increased from 130° C. to 180° C. Stirring and heating was continued until all of the required orthodichlorobenzene (150 liters) was removed. The temperature of the mixture was then lowered to achieve an internal temperature of 165°-170° C. and the reaction was continued for 6 hours. The mixture was then cooled to 70° C. and 150 liters of chloroform was added. After reaching room temperature, the product was precipitated into methanol and filtered. The resulting filtered powder was redissolved in 350 liters of chloroform, reprecipitated in 700 liters of methanol, dried in an evacuated drum dryer and steamed for 2-3 days. Based on the method of preparation, there was obtained a polyimide siloxane having an average of about 15.2 recurring dimethylsiloxy units within the scope of formula (1).

Additional polyimide siloxanes were prepared following the same procedure using the range of 1, 2, 3, 3.5 and 4 mole percent of phthalic anhydride as chainstopper and either 100 mole percent paraphenylenediamine or a mixture of metaphenylenediamine and paraphenylenediamine. Crystallized zinc borate was blended with these various polyimide siloxanes at levels of 1, 2, 3.5 and 7 parts of zinc borate, per 100 parts of the polyimide siloxane. The melt flows of the samples were tested at 240° C., 260° C., 280° C., 290.C, 300° C. and 310° C. The samples were also compression molded into 6"×6"×1/16" plaques and 1" diameter discs (2 millimeter thick) by heating at 270°-290° C. for 2 minutes at two tons of pressure and for 6 minutes at 10 tons of pressure. Compression molded parts were then held at 10 tons of pressure in a cold press until reaching ambient temperature. The plaques were tested by the Ohio State University test for smoke and heat analysis and the disc melt viscosities were determined by rheological methods.

Melt processable blends were then made using tetrabenzoyl pentaerythritol (Benzoflex S-552) with polyimide siloxane and polyimide siloxane-zinc borate blends. The melt processable blends were also measured for melt flow and melt viscosity, mechanical properties and smoke and heat characteristics.

The following results show the effect on melt flow, melt viscosity and smoke and heat character of the molecular weight of the polyimide siloxane in terms of its intrinsic viscosity (IV) and the weight percent levels per 100 parts of the polyimide siloxane, of zinc borate (ZB) and the plasticizer (BF).

TABLE 1

| IV | phr ZB[a] | % BF[b] | Melt Flow[c] |
|---|---|---|---|
| 0.67 | 0 | 0% | 0.75[290° C.] |
| 0.67 | 3.5 | 0% | 0.73[290° C.] |
| 0.67 | 7.0 | 0% | 0.65[290° C.] |
|  |  |  | 0.17[260° C.] |
| 0.67 | 7.0 | 3% | 0.42[260° C.] |
| 0.67 | 7.0 | 5% | 0.47[260° C.] |
| 0.48 | 0 | 0% | 1.24[270° C.] |
| 0.48 | 7.0 | 0% | 0.78[270° C.] |
| 0.48 | 7.0 | 4% | 1.96[270° C.] |
| 0.43 | 0 | 0% | 1.38[260° C.] |
| 0.43 | 1 | 4% | 2.19[260° C.] |
| 0.43 | 2 | 4% | 2.48[260° C.] |
| 0.43 | 3.5 | 0% | 1.20[260° C.] |
| 0.43 | 3.5 | 1% | 1.53[260° C.] |
| 0.43 | 3.5 | 2% | 1.54[260° C.] |
| 0.43 | 3.5 | 4% | 1.94[260° C.] |
|  |  |  | 0.49[240° C.] |
| 0.43 | 3.5 | 6% | 0.56[240° C.] |
| 0.43 | 3.5 | 8% | 1.46[240° C.] |

[a]ZB = Firebrake ZB {2ZnO-3(B$_2$O$_3$)-3.5H$_2$)}
[b]BF = Benzoflex S-552
[c]All melt flows were determined with a 16.6 kg weight reported in grams/min The above results show that a reduction in IV raises the melt flow, while the addition of zinc borate lowers this value and the addition of the plasticizer raises the melt flow.

The melt viscosity of these materials were also determined as shown by the following table.

TABLE 2

| IV | phr ZB[a] | % BF[b] | Melt Viscosity at 100 radians/sec[c] |
|---|---|---|---|
| 0.67 | 0 | 0% | 4.29[270° C.] |
| 0.67 | 3.5 | 0% | 4.51[270° C.] |
| 0.67 | 7.0 | 0% | 4.97[270° C.] |
| 0.48 | 0 | 0% | 2.63[270° C.] |
| 0.48 | 7.0 | 0% | 3.11[270° C.] |
| 0.48 | 7.0 | 4% | 2.31[270° C.] |
| 0.43 | 0 | 0% | 2.22[270° C.] |
|  |  |  | 2.53[260° C.] |
| 0.43 | 0 | 4% | 1.70[260° C.] |
| 0.43 | 1 | 4% | 2.27[260° C.] |
| 0.43 | 2 | 1% | 2.30[260° C.] |
| 0.43 | 2 | 4% | 2.02[260° C.] |
| 0.43 | 2 | 6% | 1.88[260° C.] |
| 0.43 | 3.5 | 0% | 2.90[260° C.] |
| 0.43 | 3.5 | 2% | 2.57[260° C.] |
| 0.43 | 3.5 | 4% | 2.05[260° C.] |
| 0.43 | 3.5 | 6% | 1.69[260° C.] |
| 0.43 | 3.5 | 8% | 1.20[260° C.] |
| 0.43 | 7.0 | 0% | 2.97[260° C.] |
| 0.43 | 7.0 | 4% | 1.98[260° C.] |

[a]ZB = Firebrake ZB {2ZnO-3(B$_2$O$_3$)-3.5H$_2$)}
[b]BF = Benzoflex S-552
[c]All melt viscosities are reported in poise It is evident that lowering the intrinsic viscosity reduces the melt viscosity, while the incorporation of zinc borate raises the melt viscosity and the plasticizer has a dramatic lowering effect on the melt viscosity.

EXAMPLE 2

The polymers prepared in accordance with the procedure of Example 1 were then evaluated for low smoke properties when blended with zinc borate or the combination of zinc borate (ZB) and tetrabenzoyl pentaerythritol (BF). In addition to the polyimide siloxanes used in the practice of the present invention, there was also evaluated silicone imides of Cella et al., U.S. Pat. No. 4,833,190 and Teflon resin. Low smoke properties were determined in accordance with the Ohio State University test for total smoke after 5 minutes in terms of smoke/squared meter (TS) and maximum smoke (MS) in terms of the release rate of smoke/minutes/-squared meter.

TABLE 3

| IV | ZB (phr) | BF (wt %) | TS at 5 min. (smoke/M$^2$) | MS release rate (smoke/min./M$^2$) |
|---|---|---|---|---|
| 0.67 | 0 | 0 | 340 | 388 |
| " | 7 | 0 | 63 | 239 |
| " | 7 | 5 | 68 | 89 |
| 0.48 | 0 | 0 | 418 | 327 |
| " | 3.5 | 0 | 405 | 288 |
| " | 7 | 0 | 393 | 302 |
| " | 2 | 4 | 212 | 259 |
| " | 3.5 | 4 | 41 | 68 |
| " | 3.5 | 4 | 49 | 56 |
| 0.43 | 0 | 0 | 494 | 540 |
| " | 3.5 | 0 | 140 | 287 |
| " | 0 | 0 | 373 | 349 |
| " | 7 | 0 | 38 | 78 |
| Cella et al. | 0 | 0 | 800 | 571 |
| Cella et al. | 7 | 0 | 555 | 276 |
| Teflon resin | 0 | 0 | 5 | 3 |

The above results show that Teflon resin is superior in low smoke properties. However, as previously discussed, Teflon resin should not by employed in plenum wire applications as it can generate highly toxic fumes when burned. Also the processing of Teflon is difficult. Table 3 also shows that the polyimidesiloxane used in the practice of the present invention can provide nonflammable low smoke compositions which do not generate highly toxic halogen-containing by-products during burning.

Although the above examples are directed to only a few of the very many variables which can be employed in the practice of the present invention to make melt processable halogen-free wire coating compositions, it should be understood that the present invention is directed to the use of a much broader variety of polyimide siloxanes and plasticizers set forth in the description preceding these examples.

What is claimed is:

1. An adherent melt processable plasticized halogen-free wire coating composition comprising a polyimidesiloxane and an effective amount of hydrated zinc borate which has an ASTM-E096 total smoke value (smoke/M$^2$) after a 5 minute burn of less than about 100.

2. An adherent, melt processable, halogen-free wire coating comprising in accordance with claim 1 comprising a polyimide siloxane having recurring chemically combined imide-siloxane groups of the formula,

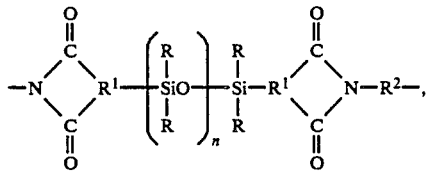

and an effective amount of hydrated zinc borate, where R is a $C_{(1-14)}$ monovalent hydrocarbon radical, or a $C_{(1-14)}$ monovalent hydrocarbon radical substituted with the same or different radicals inert during condensation reactions, $R^1$ is a $C_{(6-14)}$ trivalent aromatic organic radical, $R^2$ is a $C_{(6-14)}$ divalent aromatic organic radical, and n is an integer equal to 1 to about 25 inclusive.

3. An adherent, melt processable, halogen-free wire coating composition in accordance with claim 2, where the recurring chemically combined imide siloxane groups have the formula

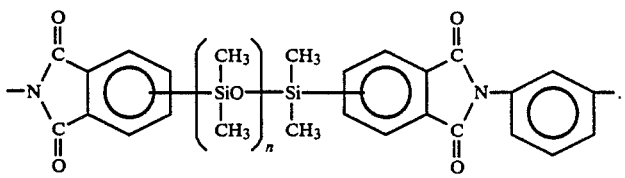

4. An adherent, melt processable, halogen-free wire coating composition in accordance with claim 2, where the recurring chemically combined imide siloxane groups have the formula

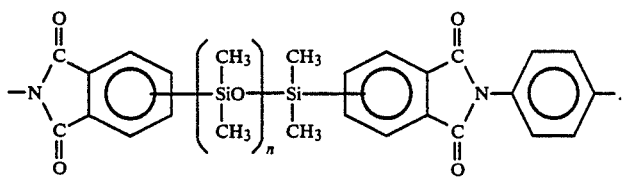

5. An adherent melt processable halogen-free wire coating composition in accordance with claim 1, which is plasticized with tetrabenzoylpentaerythritol.

6. An adherent melt processable halogen-free wire coating composition in accordance with claim 1, where $R^2$ is a mixture of a metaphenylene radical and a paraphenylene radical.

7. An adherent melt processable halogen-free wire coating composition in accordance with claim 2, which has from 30% to 70% by weight silicone based on poly(imide siloxane).

8. An adherent melt processable halogen-free wire coating composition in accordance with claim 1, having a melt viscosity of 15000 to 25000 poise at 100 radians per second at about 240° C. to 280° C.

* * * * *